US010051645B2

(12) United States Patent
Arvidson et al.

(10) Patent No.: US 10,051,645 B2
(45) Date of Patent: Aug. 14, 2018

(54) METHOD AND NETWORK NODE FOR SECTOR SELECTION

(71) Applicant: Telefonaktiebolaget LM Ericsson (publ), Stockholm (SE)

(72) Inventors: Pontus Arvidson, Danderyd (SE); Lars Roselius, Solna (SE); Richard Tano, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/105,988

(22) PCT Filed: Dec. 20, 2013

(86) PCT No.: PCT/SE2013/051608
§ 371 (c)(1),
(2) Date: Jun. 17, 2016

(87) PCT Pub. No.: WO2015/094070
PCT Pub. Date: Jun. 25, 2015

(65) Prior Publication Data
US 2016/0323899 A1    Nov. 3, 2016

(51) Int. Cl.
*H04W 72/08*     (2009.01)
*H04B 7/024*     (2017.01)
(Continued)

(52) U.S. Cl.
CPC .......... *H04W 72/085* (2013.01); *H04B 7/024* (2013.01); *H04B 7/0491* (2013.01);
(Continued)

(58) Field of Classification Search
None
See application file for complete search history.

(56) References Cited

U.S. PATENT DOCUMENTS

2002/0102950 A1    8/2002  Gore et al.
2004/0196919 A1   10/2004  Mehta et al.
(Continued)

FOREIGN PATENT DOCUMENTS

EP          1933492 A1       6/2008
WO     WO2012/052066    *  4/2012   ............ H04W 16/28

OTHER PUBLICATIONS

Heath, R., "A Current Perspective on Distributed Antenna Systems for the Downlink of Cellular Systems", IEEE Communications Magazine, IEEE Service Center, Piscataway, US, vol. 51, No. 4. Apr. 1, 2013, pp. 161-167, XP011499949.

(Continued)

*Primary Examiner* — Ayaz Sheikh
*Assistant Examiner* — Mariela Vidal Carpio
(74) *Attorney, Agent, or Firm* — Sage Patent Group

(57) ABSTRACT

The disclosure provides a method 30 for sector selection performed in a communication system 1 providing wireless communication to a communication device. The communication system 1 is configured for shared cell deployment, the shared cell 9 comprising at least two sectors 2, 3, 4. The communication system (1) is configured for link adaptation of a radio link between the communication device and the shared cell 9. The method 30 comprises: selecting 31, for the communication device 5, a set of sectors 2, 3, 4 for use in downlink transmissions to the communication device 5; determining 32, for the communication device 5, a link adaptation parameter value relating to the link adaptation; adapting 33, for a link adaptation parameter value that is higher than a threshold value, the set of sectors by adding a sector. The disclosure provides corresponding system, computer program and computer program products.

23 Claims, 4 Drawing Sheets

(51) Int. Cl.
    *H04B 7/0491*    (2017.01)
    *H04B 17/336*   (2015.01)
    *H04B 7/06*      (2006.01)
    *H04L 5/00*      (2006.01)

(52) U.S. Cl.
    CPC ......... *H04B 7/0623* (2013.01); *H04B 7/0626* (2013.01); *H04B 17/336* (2015.01); *H04L 5/0048* (2013.01)

(56) References Cited

U.S. PATENT DOCUMENTS

| | | | |
|---|---|---|---|
| 2005/0075081 A1 | 4/2005 | Catreux-Erceg et al. | |
| 2008/0089287 A1* | 4/2008 | Sagfors | H04W 36/026 370/331 |
| 2009/0092055 A1* | 4/2009 | Balasubramanian | H04L 45/00 370/252 |
| 2010/0226264 A1* | 9/2010 | Axmon | H04J 11/0079 370/252 |
| 2010/0323611 A1 | 12/2010 | Choudhury | |
| 2011/0081937 A1* | 4/2011 | Nakamura | H04W 52/243 455/522 |
| 2011/0149914 A1* | 6/2011 | Tidestav | H04B 7/0434 370/335 |
| 2011/0170420 A1* | 7/2011 | Xi | H04L 5/001 370/241 |
| 2012/0020421 A1* | 1/2012 | Larsson | H04L 5/0032 375/260 |
| 2012/0149429 A1* | 6/2012 | Martin | H04W 24/02 455/525 |
| 2012/0155429 A1* | 6/2012 | Lin | H04W 36/0005 370/331 |
| 2013/0201884 A1* | 8/2013 | Freda | H04W 72/005 370/278 |
| 2013/0203430 A1* | 8/2013 | Gan | H04W 48/18 455/450 |
| 2014/0016685 A1* | 1/2014 | Fu | H04B 7/082 375/224 |
| 2014/0086155 A1* | 3/2014 | Chen | H04B 7/0626 370/329 |
| 2014/0112172 A1* | 4/2014 | Vangala | H04W 24/06 370/252 |
| 2014/0269575 A1* | 9/2014 | Zhang | H04W 72/042 370/329 |
| 2014/0328182 A1* | 11/2014 | Gao | H04W 28/08 370/236 |
| 2015/0304092 A1* | 10/2015 | Hwang | H04L 5/0098 370/280 |

OTHER PUBLICATIONS

Song, Y., et al., "Collaborative MIMO", IEEE C802.16m-07/244r, Internet Citation, Nov. 7, 2007, 9 pages, XP002547035.
International Search Report and Written Opinion dated Jun. 11, 2014, issued in International Application No. PCT/SE2013/051608, 10 pages.
"LTE; Evolved Universal Terrestrial Radio Access (E-UTRA); Physical layer—Measurements (3GPP TS 36.214 version 8.7.0 Release 8)", ETSI TS 136 214, V8.7.0 (Oct. 2009), 14 pages.
"LTE; Evolved Universal Terrestrial Radio Access (E-UTRA), Physical channels and modulation (3GPP TS 36.211 version 8.9.0 Release 8)", ETSI TS 136 211, V8.9.0 (Jan. 2010), 85 pages.

* cited by examiner

METHOD AND NETWORK NODE FOR SECTOR SELECTION

CROSS-REFERENCE TO RELATED APPLICATION(S)

This application is a 35 U.S.C. § 371 National Phase Entry Application from PCT/SE2013/051608, filed Dec. 20, 2013, and designating the United States.

TECHNICAL FIELD

The technology disclosed herein relates generally to the field of wireless communication systems, and in particular to sector selection in shared cell deployment.

BACKGROUND

Wireless communication increases rapidly and various ways to accommodate the increased number of users and amount of traffic are discussed and developed. FIG. 1 illustrates a typical deployment in a wireless communication network 1. A first network node 2, e.g. an evolved node B (eNB), provides wireless communication to a number of communication devices 5 (denoted user equipment, UE, in the following) within a coverage area 6, often denoted cell. Within the coverage area 6 of this first network node 2 further network nodes 3, 4 (e.g. remote radio units or access points) may be arranged having a respective coverage area 7, 8. This is a typical heterogeneous network deployment, wherein the further network nodes 3, 4 (e.g. pico nodes) are configured to transmit at a lower power than the first network node 2 (e.g. macro node). In such deployment, each network node 2, 3, 4 has its own cell identification (ID), a cell and a cell identification thus being mapped one to one.

In Long Term Evolution (LTE) standard a concept called shared cell (also denoted cell merge, combined cell or multi sector cell) is discussed. FIG. 2 illustrates such shared cell deployment. The shared cell 9 comprises (as in the deployment of FIG. 1) multiple network nodes 2, 3, 4, often denoted sectors in this context. The shared cell 9 may thus contain multiple sectors 2, 3, 4, and transmission to and reception from the UE 5 can be done by one sector or by multiple sectors. In the shared cell, the different sectors are allowed to use the same Physical Cell Identity (PCI) and thus all sectors are considered, by the UE 5, to be one single cell 9. With the shared cell concept the ID of one cell is, in contrast to the above deployment, mapped to several sectors. Using shared cell instead of the regular deployment (shown in FIG. 1) may give less capacity, since a reduced number of users can be scheduled simultaneously with fewer cell IDs. There are several benefits with the shared cell deployment, for example the reduction of coverage holes enabled by allowing multiple coverage areas within the same cell. Further, interference from data transmissions in downlink is reduced by using a subset of sectors and no handover is needed when the UE 5 moves from one sector to another using the same cell ID.

In a Third Generation Partnership Project (3GPP) LTE Release 8 system with the shared cell deployment, downlink channel quality measurements are made based on cell specific reference signals (CRSs). While data transmissions in the shared cell 9 may be transmitted in only a selected subset of all the sectors within the shared cell 9, CRS still needs to be transmitted in all sectors since other UEs than the intended receiver of the data transmission should also receive them. This may lead to a UE 5 seriously overestimating a channel if the CRS are received from sectors that are not within the set of sectors selected for data transmissions. This may in turn have a serious impact on downlink performance for this UE 5.

In particular, with currently existing solutions, the sectors selected for downlink data transmissions are typically chosen based on uplink channel measurements. When only a subset of the sectors are used for transmission there is a risk that the UE may still receive CRS transmissions from sectors not included in the subset of sectors chosen for data transmissions. As the channel estimates on the UE side are performed based on CRS receptions, this may lead to an overestimation of the downlink channel which will lead to link adaptation using a more aggressive choice of modulation and coding scheme which in turn will cause an increased probability of decoding errors in the UE.

Furthermore, the CRS channel estimations are also used for demodulation. In the demodulation erroneous channel estimates may have an even larger impact than when used for link adaptation only.

SUMMARY

An object of the present disclosure is to solve or at least alleviate at least one of the above mentioned problems.

The object is according to a first aspect achieved by a method for sector selection performed in a communication system providing wireless communication to a communication device. The communication system is configured for shared cell deployment, and the shared cell comprises at least two sectors, the communication system is configured for link adaptation of a radio link between the communication device and the shared cell. The method comprises: selecting, for the communication device, a set of sectors for use in downlink transmissions to the communication device; determining, for the communication device, a link adaptation parameter value relating to the link adaptation, and adapting, for a link adaptation parameter value that is higher than a threshold value, the set of sectors by adding a sector.

The method provides an increased downlink throughput in a shared cell, particularly in areas where there is coverage overlap between two or more sectors of the shared cell. A communication device that has estimated its channel wrongly is quickly detected and data transmissions are quickly aligned with reference signals. The method enables a corrupted channel estimate to be addressed faster in situations where an outer loop link adaptation alone will not suffice without a severe decrease in throughput. An important advantage of shared cell deployment is the avoidance of handovers, and the method provides a way to avoid throughput degradation where the sectors of the shared cell overlap.

The object is according to a second aspect achieved by a communication system for sector selection. The communication system provides wireless communication to a communication device and the communication system is configured for shared cell deployment, wherein the shared cell comprises at least two sectors. The communication system is configured for link adaptation of a radio link between the communication device and a shared cell. The communication system comprises at least one processor and memory, the memory containing instructions executable by the processor, whereby the communication system is operative to: select, for the communication device, a set of sectors for use in downlink transmissions to the communication device; determine, for the communication device, a link adaptation parameter value relating to the link adaptation; and adapt, for a link adaptation parameter value that is higher than a threshold value, the set of sectors by adding a sector.

The object is according to a third aspect achieved by a computer program for sector selection for a communication system providing wireless communication to a communication device. The communication system is configured for shared cell deployment, the shared cell comprising at least two sectors. The communication system is configured for link adaptation of a radio link between the communication device and a sector. The computer program comprises computer program code, which, when run on the communication system causes the communication system to: select, for the communication device, a set of sectors for use in downlink transmissions to the communication device; determine, for the communication device, a link adaptation parameter value relating to the link adaptation; adapt, for a link adaptation parameter value that is higher than a threshold value, the set of sectors by adding a sector.

The object is according to a fourth aspect achieved by a computer program product comprising a computer program above, and a computer readable means on which the computer program is stored.

The object is according to a fifth aspect achieved by a communication system comprising means for selecting, for the communication device, a set of sectors for use in downlink transmissions to the communication device; means for determining, for the communication device, a link adaptation parameter value relating to the link adaptation; means for adapting, for a link adaptation parameter value that is higher than a threshold value, the set of sectors by adding a sector.

The object is according to a sixth aspect achieved by network node of a communication system for sector selection. The network node provides wireless communication to a communication device and the network node is configured for shared cell deployment, wherein the shared cell comprises at least two sectors. The network node is configured for link adaptation of a radio link between the communication device and a shared cell. The network node comprises at least one processor and memory, the memory containing instructions executable by the processor, whereby the network node is operative to: select, for the communication device, a set of sectors for use in downlink transmissions to the communication device; determine, for the communication device, a link adaptation parameter value relating to the link adaptation; and adapt, for a link adaptation parameter value that is higher than a threshold value, the set of sectors by adding a sector.

Further features and advantages of the present disclosure will become clear upon reading the following description and the accompanying drawings.

DETAILED DESCRIPTION

Figure 1:
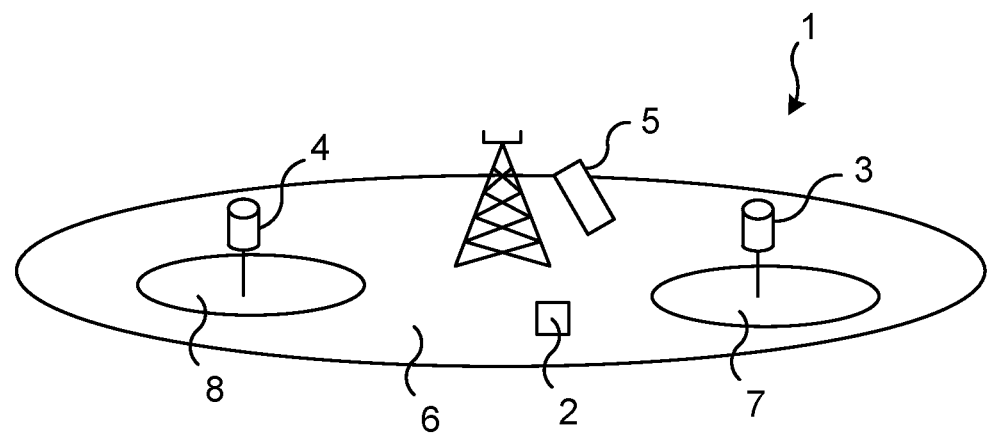
FIG. 1 illustrates a wireless network deployment comprising several cells.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, in an aspect the present disclosure provides a method for preventing the decrease in downlink throughput that may occur for a UE close to two or more sectors in a shared cell. The method involves dynamically adapting the size of the selected antenna set based on the behavior of downlink link adaptation.

Figure 2:
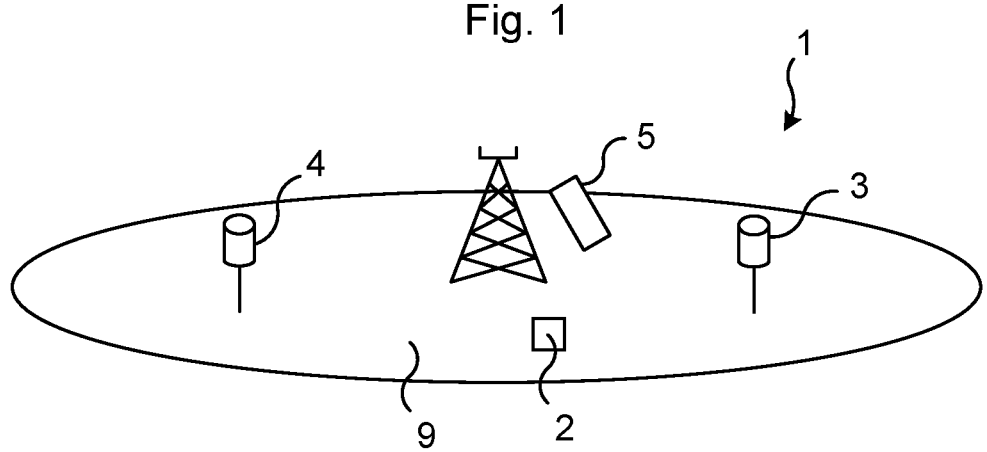
FIG. 2 illustrates a wireless network deployment comprising a shared cell, and in which embodiments of the present disclosure may be implemented.

Referring again to FIG. 2, in order to reduce the downlink inter-cell interference in the shared cell deployment, a subset of the sectors in a shared cell 9 can be selected for downlink transmission. Which sectors to select for a particular UE 5 depends mainly on the location of the UE 5; the closer to a sector the UE is, the better channel conditions it has in general. Sectors close to the UE 5 are hence typically selected for downlink transmission while sectors far away from the UE 5 are not selected.

Link adaptation has the goal of setting the modulation and coding scheme (MCS) for the UE 5 based on its radio conditions so as to maximize throughput. An inner loop link adaptation (ILLA) is used for selecting the appropriate MCS for the UE 5. The selection may be done by a table look-up Signal to Interference plus noise ratio (SINR), mapping a measured SINR of the CRS to the best MCS for an allocation. The SINR measurements of the CRS are received in the network node in a Channel Quality Indicator (CQI) report.

To further increase the accuracy of link adaptation, an outer loop link adaptation (OLLA) is used to increase or decrease the chosen MCS based on Hybrid Automatic-Repeat-Request (HARQ) feedback. More specifically, the target of the OLLA is to adapt the MCS selection to provide a certain block error rate (BLER).

As described in the background section, the sectors selected for downlink data transmissions are typically chosen based only on uplink channel measurements. However, since the UE 5 may receive CRS transmissions from sectors not included in this set of selected sectors, the channel estimates on the UE side performed based on CRS receptions may lead to an overestimation of the downlink channel which will lead to a more aggressive choice of MCS which in turn will cause an increased probability of decoding errors.

The UE 5 is unaware of being connected to a shared cell 9, and the sector selection is performed based on quality measurements in the uplink as these uplink measurements are available per sector 2, 3, 4. That is, the UE 5 may provide, to its serving network node, CQI-reports relating to the channels to the different sectors.

To determine if the selected set of sectors is sufficient, e.g. in view of data throughput or signal quality, the behavior of downlink link adaptation is, in various embodiments, taken into consideration. If the UE's 5 channel estimate is corrupted due to 'leakage' of CRS from sectors that does not belong to the selected set of sectors, then the block error rate (BLER) of the UE 5 will quickly rise.

Generally, increasing BLER is countered by the existing link adaptation outer loop by backing off to a more conservative choice of MCS based on the HARQ feedback until the BLER is back at a target level. However, in various embodiments of the present disclosure, the link adaptation outer loop is used as an indicator of when the channel estimates are corrupted. The set of selected sectors may then be extended whenever the outer loop compensation exceeds a pre-configurable threshold. The link adaptation outer loop scheme for counteracting the increasing BLER is a rather slow way of counteracting the increasing BLER, and is in various embodiments aided by using an additional sector. The set of sectors, now thus comprising an additional sector, may rapidly increase the received signal in the UE 5.

A higher number of selected sectors, i.e. higher number of selected transmission antennas, will increase the amount of interference caused for neighboring cells. This means that there is also a cost associated with using more sectors than necessary for downlink transmissions. To keep the number of selected sectors down, a time counter is implemented in various embodiments. The time counter, or timer, may be reset each time the selected set of sectors is modified and the selected set of sectors may be decreased by one as the timer expires.

By the various embodiments, an improved downlink throughput may be obtained, in particular in areas where coverage from two or more sectors overlap in a shared cell. Avoiding handovers between sectors is one of the main advantages of a shared cell deployment and it is therefore important to avoid throughput degradation where sectors overlap.

Figure 3:
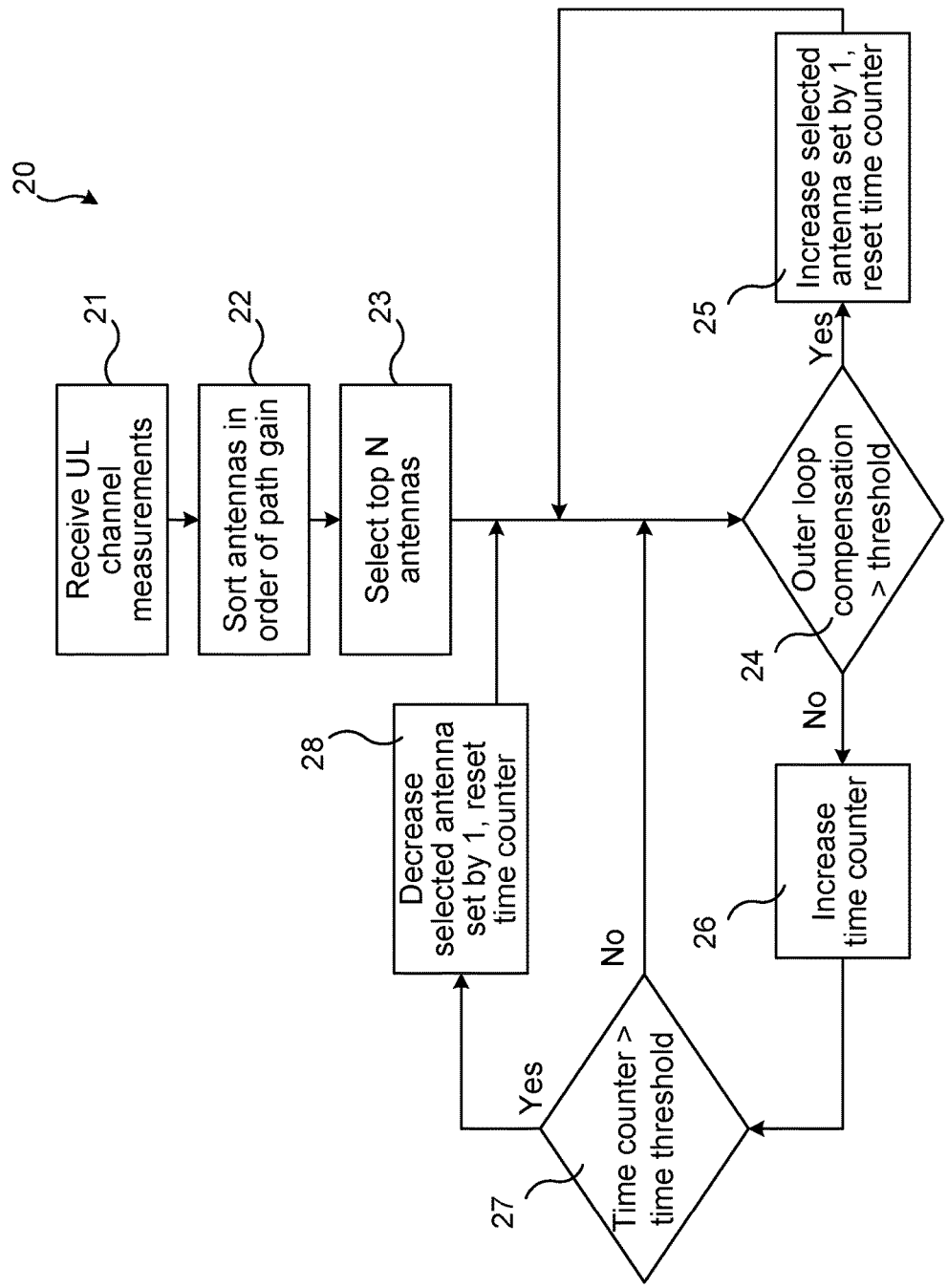
FIG. 3 is a flowchart illustrating a sector selection process in accordance with an aspect of the present disclosure.

FIG. 3 is a flowchart illustrating a sector selection process 20 in accordance with an aspect of the present disclosure. The sector selection process 20 may be performed in a network node such as a sector selector device, a scheduler or in a radio base station (e.g. eNB).

In box 21, the network node receives uplink channel measurements for one or more sectors 2, 3, 4, e.g. by sounding reference signal (SRS) measurements or uplink demodulation reference signal (UL-DMRS) measurements from a UE 5. The uplink channel measurements received from the particular UE 5 thus provides channel estimates to the different sectors. Based thereon, the network node determines the path gain between the respective sector and the UE 5.

In box 22, the network node may sort the sectors 2, 3, 4 in order of decreasing path gain. That is, the sector 2, 3, 4 with the highest path gain to the UE 5 is to be selected first, the sector 2, 3, 4 with the next highest path gain to the UE 5 is to be selected second, and so on.

In box 23, the network node selects a number N of the available sectors 2, 3, 4. This selected set of N sectors 2, 3, 4 is an initial set of sectors, also denoted initial set of transmit antennas. The size of the initial selected set of sectors, N, may be a fixed parameterized value, or it may be set to include all sectors that fulfill a certain criterion, such as low isolation degree (i.e. low difference in path gain) towards the top sector, which is the sector having the highest path gain. It is also noted that the number N of selected sectors may be allowed to vary between iterations, i.e. the size of the sector set may, but need not, be changed upon receiving new uplink measurements.

In box 24, the network node determines whether a criterion is fulfilled, in particular whether an outer loop link adaptation compensation is higher than a threshold value. For example, in box 24, the network node may determine that an increase in BLER is higher than a pre-configured threshold value. The threshold value is set so that corrupted channel estimates can be detected with sufficient accuracy. The threshold value may be calibrated so that the throughput degradation in areas where sectors overlap is mitigated to an as large degree as possible without causing unnecessary interference to neighboring cells.

If, in box 24, the compensation value is higher than the threshold, then the flow continues to box 25. In box 25, the selected set of sectors is increased by one and if a time counter is implemented, this time counter is reset. The flow then returns to box 24, wherein the fulfilment of the criterion is again determined. Such determination may for example be performed periodically, e.g. as often as each transmission time interval (TTI), or the determination may be event-triggered, e.g. performed when transmitting or receiving (e.g. a measurement report) etc.

If, in box 24, the compensation value is determined not to be higher than the threshold, then the flow continues to box 26. As mentioned earlier, a higher number of selected transmission antennas (i.e. higher number of sectors) will increase the amount of interference caused for neighboring cells. To counteract this cost associated with using more antennas for downlink transmissions a time counter may be implemented to keep the number of selected transmission antennas down. The time counter may be reset each time the selected set of sectors is modified and the selected set of sectors may be decreased by one as the timer expires. Therefore, in box 26, the time counter is started or increased.

In box 27, it is determined whether the time counter has reached a pre-configured time limit or time threshold. If the time counter has not reached the time threshold, the flow returns to box 24, wherein the fulfilment of the criterion is again determined. If the time counter has reached the time threshold, then the flow continues to box 28, wherein the selected set of sectors is decreased by 1. The time counter is also reset. The flow returns to box 24, wherein the fulfilment of the criterion is again determined.

Figure 4:
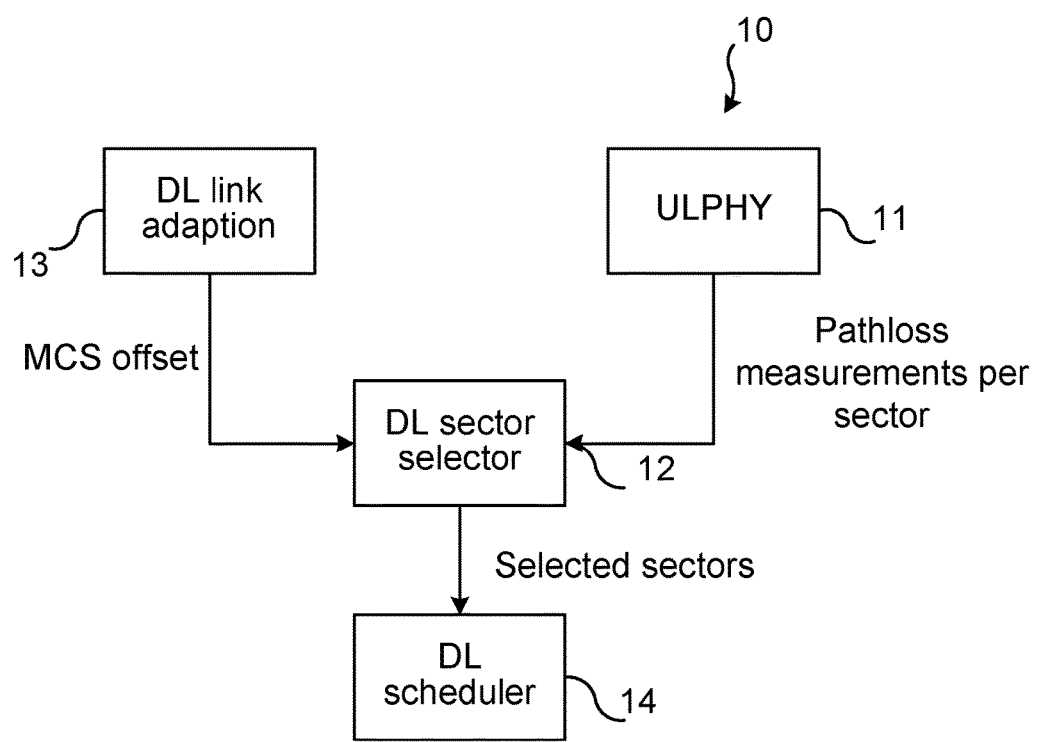
FIG. 4 illustrates network node functions in accordance with an aspect of the present disclosure.

FIG. 4 illustrates network node functions in accordance with an aspect of the present disclosure. The illustrated network node 10 is illustrated as different function modules 11, 12, 13, and 14. In a first function module 11, denoted ULPHY, uplink physical layer, in the figure, gain measurements relating to a particular UE 5 are received for all sectors 2, 3, 4. Pathloss measurements per sector are provided to a second function module 12, a downlink (DL) sector selector, which may determine the path gain between the UE 5 and the respective sectors (compare box 22 of FIG. 3). The second function module 12 also receives a DL link adaptation parameter value from a third function module 13, denoted DL link adaptation in the figure. This link adaption parameter value may for example be a MCS offset. The second function module 12 is now able to select sectors for the UE 5 and provide information of the selected sectors to a fourth function module 14, denoted DL scheduler in the figure. The fourth function module 14 thus allocates downlink resources to the UE 5 in conventional manner.

The described features may be combined in various ways to provide different embodiments of a method for sector selection.

Figure 5:
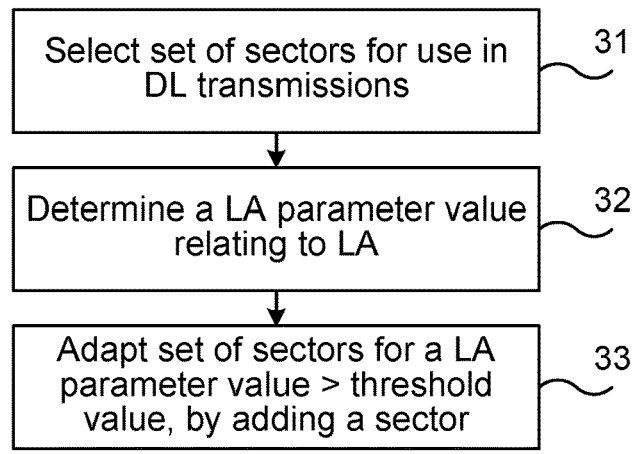
FIG. 5 illustrates a flow chart over steps of a method in a communication system in accordance with the present disclosure.

FIG. 5 illustrates a flow chart over steps of a method 30 in a communication system (1) in accordance with the present disclosure. The method 30 may thus be used for sector selection and is performed in a communication system 1 providing wireless communication to a communication device 5. The communication system 1 is configured for shared cell deployment, wherein the shared cell 9 comprises at least two sectors 2, 3, 4. The communication system 1 is configured for link adaptation of a radio link between the communication device 5 and the shared cell 9.

The method 30 comprises selecting 31, for the communication device 5, a set of sectors 2, 3, 4 for use in downlink transmissions to the communication device 5. It is noted that this selection of the (initial) set of sectors 2, 3, 4 may be done in accordance with prior art, e.g. based on pathloss measurements per sector.

The method 30 comprises determining 32, for the communication device 5, a link adaptation parameter value relating to the link adaptation. By this determination a corrupted channel estimated may be detected, as described earlier.

The method 30 comprises adapting 33, for a link adaptation parameter value that is higher than a threshold value, the set of sectors by adding a sector. By this adaptation, the effects of the corrupted channel estimate are overcome. That is, effects such as the UE 5 experiencing a decreased throughput are overcome.

It is noted that typically, the higher a value of a link adaptation parameter value is, the worse the channel is, i.e. a high value indicates a bad channel. However, it is to be understood that an opposite criterion is equivalent to this. That is, a parameter equivalent to link adaptation parameter measuring how good a channel is (as opposed to how bad it is) could be used, and be compared to a threshold value. For a parameter being below the threshold value (i.e. not good enough) the set of sectors is adapted by adding a sector.

In an embodiment, the link adaptation comprises a downlink link adaptation, the link adaptation parameter value comprises a Signal-to-Interference and Noise ratio, SINR, adjustment and the threshold comprises a SINR adjustment threshold. In this embodiment, the determining 32 comprises:
 receiving, from the communication device 5, a feedback report relating to a downlink transmission, the feedback report comprising a positive or negative acknowledgment,
 establishing, based on the feedback report a need to adjust the SINR, and
 determining a SINR adjustment to be equal to the SINR adjustment threshold.

In this embodiment, a known way of determining the link adaptation parameter (here being SINR adjustment) is used in the method 30, whereby the method may utilize and take advantage of existing algorithms.

In an embodiment, the link adaptation comprises a downlink link adaptation and wherein the determining 32 the link adaptation parameter value comprises a block error rate. In this embodiment, the determining 32 comprises:
 determining a block error rate for the communication device 5 based on feedback reports relating to downlink transmissions to the communication device 5.

In a variation of the above embodiment, the determining the block error rate is based on time filtering of at least two feedback reports, the at least two feedback report relating to respective downlink transmission to the communication device 5. By filtering in time the BLER, which may change over time, an improved accuracy may be obtained, and also a value more relevant for comparison.

In other variation of the above embodiment, the feedback reports comprises positive and/or negative acknowledgment messages (ACKs/NACKs).

In an embodiment, the method 30 comprises:
 starting, upon adding a sector, a time counter, and
 adapting, for the time counter indicating an elapsed time higher than a time threshold, the set of sectors by removing a sector.

As described earlier, such embodiments combat the negative effects of utilizing many sectors for downlink transmissions, e.g. combatting the interference created thereby.

In an embodiment, the selecting 31 the set of sectors 2, 3, 4 comprises:
 receiving, from one or more of the sectors 2, 3, 4, uplink channel measurements relating to the communication device 5, and
 selecting the set of sectors 2, 3, 4 based on the uplink channel measurements.

In this embodiment, a known way of selecting the set of sectors is used in the method 30, and the method may utilize and take advantage of existing algorithms.

In a variation of the above embodiment, the selecting comprises determining, for each respective sector 2, 3, 4, path gain to the communication device 5 based on the received uplink channel measurements and selecting N sectors having N highest path gains as the set of sectors.

In an embodiment, the link adaptation parameter value comprises block error rate, signal-to-interference and noise ratio, throughput degradation or increased number of retransmissions. The link adaptation parameter may thus be any of a variety of different parameters, providing flexibility in implementation.

In an embodiment, the adapting 33 comprises adding a sector having the highest path gain to the communication device 5 among sectors not currently used by the communication device 5.

In an embodiment, the method 30 is performed in a network node 2, 3, 4, 10 of the communication system 1. For example, in one embodiment one network node is configured to perform the method, in other embodiments the functionality of the network node is distributed within the communication system 1 such that certain functions are performed in one network node and another function is performed in an other network node. As a particular example, the various steps of the method may be distributed within a distributed cloud environment, such that different processing units within the distributed cloud environment performs one or more steps of the method.

Figure 6:
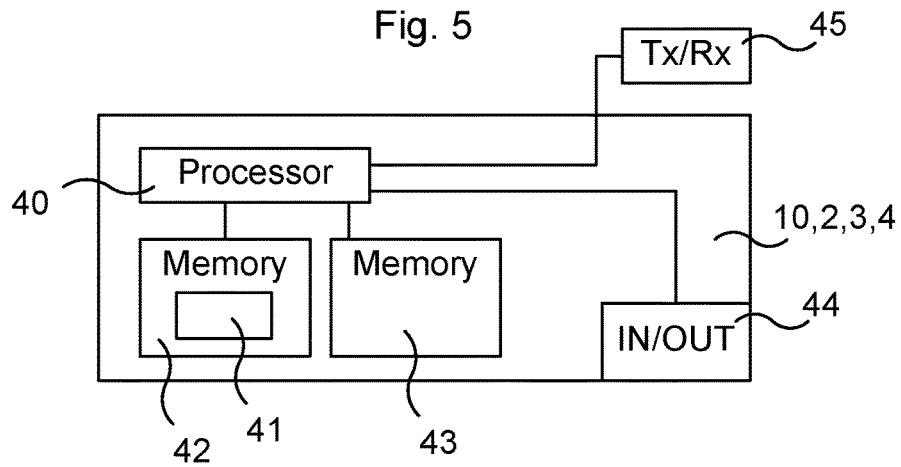
FIG. 6 illustrates schematically a network node of a communication system and means for implementing methods of the present disclosure.

FIG. 6 illustrates schematically a network node of the communication system 1 and means for implementing methods of the present disclosure. The method as described may be implemented in the communication system 1, e.g. in a single network node 2, 3, 4, 10, such as a sector selector, a scheduler or in a radio base station (e.g. eNB). It is noted that different functions may be configured to be performed by different devices or implemented by software instructions run on a processor, wherein, again, different functions may be implemented as different sets of software instructions.

The communication system 1 comprises at least one processor 40 (in the figure exemplified as being provided in a network node). The processor 40 comprises any combination of one or more of a central processing unit (CPU), multiprocessor, microcontroller, digital signal processor (DSP), application specific integrated circuit etc. capable of executing software instructions stored in a memory 42, which can thus be a computer program product 42. The processor 40 can be configured to execute any of the various embodiments of the method e.g. as described in relation to FIG. 5. The memory 42 can be any combination of read and write memory (RAM) and read only memory (ROM). The memory 42 also comprises persistent storage, which, for example, can be any single one or combination of magnetic memory, optical memory, solid state memory or even remotely mounted memory. The communication system 1 may comprise several such processors distributed within the communication system and each processor performing one or more steps of the method.

A data memory 43 may also be provided for reading and/or storing data during execution of software instructions in the processor 40. The data memory 43 can be any combination of read and write memory (RAM) and read only memory (ROM).

The communication system 1, e.g. a network node 2, 3, 4, 10 thereof, may comprise an input/output device 44 (I/O or IN/OUT) constituting an interface for communication exchange with e.g. other network nodes.

The communication system 1 may further comprise or be configured to control a number of antennas 45, for providing wireless communication to UEs, in particular by transmitting and/or receiving signaling to/from the UEs within its coverage area.

A communication system 1 is thus provided configured for performing the method as described. In particular, a communication system 1 for sector selection is provided. The communication system 1 provides wireless communication to a communication device 5. The communication system 1 is configured for shared cell deployment, wherein the shared cell 9 comprises at least two sectors 2, 3, 4. The communication system 1 is configured for link adaptation of a radio link between the communication device 5 and a shared cell 9. The communication system 1 comprises at least one processor 40 and memory 41, the memory 41 containing instructions executable by the processor 40, whereby the communication system 1 is operative to:
- select, for the communication device 5, a set of sectors 2, 3, 4 for use in downlink transmissions to the communication device 5,
- determine, for the communication device 5, a link adaptation parameter value relating to the link adaptation,
- adapt, for a link adaptation parameter value that is higher than a threshold value, the set of sectors by adding a sector.

The communication system 1 may comprise several processors, e.g. distributed within a cloud environment, and wherein one processor performs one or more steps and one or more processors the remaining steps.

It is noted that the communication system may comprise one network node, whereby this network node comprises at least one processor 40 and memory 41, the memory 42 containing instructions executable by the processor 40, and whereby the network node is operative to perform the above steps.

In an embodiment, the link adaptation comprises a downlink link adaptation, the link adaptation parameter value comprises a Signal-to-Interference and Noise ratio, SINR, adjustment, and wherein the threshold comprises a SINR adjustment threshold, and wherein the communication system 1 is configured to determine by:
- receiving, from the communication device 5, a feedback report relating to a downlink transmission, the feedback report comprising a positive or negative acknowledgment,
- establishing, based on the feedback report a need to adjust the SINR, and
- determining a SINR adjustment to be equal to the SINR adjustment threshold.

In an embodiment, the link adaptation comprises a downlink link adaptation and wherein the link adaptation parameter value comprises a block error rate and wherein the communication system 1 is configured to determine by:
- determining a block error rate for the communication device 5 based on feedback reports relating to downlink transmissions to the communication device 5.

In a variation of the above embodiment, the communication system 1 is configured to determine the block error rate based on time filtering of at least two feedback reports, the at least two feedback report relating to respective downlink transmission to the communication device 5.

In variations of the above two embodiments, the feedback reports comprises positive and/or negative acknowledgment messages.

In an embodiment, the communication system 1 is configured to:
- start, upon adding a sector, a time counter, and
- adapt, for the time counter indicating an elapsed time higher than a time threshold, the set of sectors by removing a sector.

In an embodiment, the communication system 1 is configured to select the set of sectors 2, 3, 4 by:
- receiving, from one or more of the sectors 2, 3, 4, uplink channel measurements relating to the communication device 5, and
- selecting the set of sectors 2, 3, 4 based on the uplink channel measurements.

In a variation of the above embodiment, the communication system 1 is configured to select by determining, for each respective sector 2, 3, 4, path gain to the communication device 5 based on the received uplink channel measurements and selecting N sectors having N highest path gains as the set of sectors.

In an embodiment, the link adaptation parameter value comprises block error rate, signal-to-interference and noise ratio, throughput degradation or increased number of retransmissions.

In an embodiment, the communication system 1 is configured to adapt by adding a sector having the highest path gain to the communication device 5 among sectors not currently used by the communication device 5.

As has been note earlier, in various embodiments, the methods as described may be performed in a single network node 2, 3, 4, 10 of the communication system 1, the single network node 2, 3, 4, 10 being configured as described above. The at least one processor 40 and memory 41 may be housed within a single network node 2, 3, 4, 10 of the communication system 1.

The disclosure also encompasses such a network node; in particular a network node 2, 3, 4, 10 of a communication system 1 is thus provided configured for performing the various embodiments of the method as described. In particular, a network node 2, 3, 4, 10 for sector selection is provided. The network node 2, 3, 4, 10 provides wireless communication to a communication device 5. The network node 2, 3, 4, 10 is configured for shared cell deployment, wherein the shared cell 9 comprises at least two sectors 2, 3, 4. The network node 2, 3, 4, 10 is configured for link adaptation of a radio link between the communication device 5 and a shared cell 9. The network node 2, 3, 4, 10 comprises at least one processor 40 and memory 41, the memory 42 containing instructions executable by the processor 40, whereby the network node 2, 3, 4, 10 is operative to: select, for the communication device 5, a set of sectors 2, 3, 4 for use in downlink transmissions to the communication device 5; determine, for the communication device 5, a link adaptation parameter value relating to the link adaptation; adapt, for a link adaptation parameter value that is higher than a threshold value, the set of sectors by adding a sector.

The present disclosure also encompasses a computer program product 42 comprising a computer program 41 for implementing the methods as described above, and a computer readable means on which the computer program 41 is stored. The computer program product 42 may be any combination of read and write memory (RAM) or read only memory (ROM). The computer program product 42 may also comprise persistent storage, which for example can be any single one or combination of magnetic memory, optical memory or solid state memory.

The present teachings thus comprise a computer program 41 for sector selection for a communication system 1 providing wireless communication to a communication device 5. The communication system 1 is configured for shared cell deployment, wherein the shared cell 9 comprises at least two sectors 2, 3, 4. The communication system 1 is configured for link adaptation of a radio link between the communication device 5 and a sector 2, 3, 4. The computer program 41 comprises computer program code, which, when run on the communication system 1, e.g. run on one or more processors within the communication system, causes the communication system 1 (or a node thereof) to:
  select, for the communication device 5, a set of sectors 2, 3, 4 for use in downlink transmissions to the communication device 5,
  determine, for the communication device 5, a link adaptation parameter value relating to the link adaptation,
  adapt, for a link adaptation parameter value that is higher than a threshold value, the set of sectors by adding a sector.

It is noted that the computer program 41 may comprise several software modules comprising computer program code, each module performing one or more of the steps of the method. Such software modules may be distributed within the communication system, e.g. run on different processors within the communication system 1.

A computer program product 42 comprising a computer program 41 as above and a computer readable means on which the computer program 41 is stored is also provided.

Figure 7:
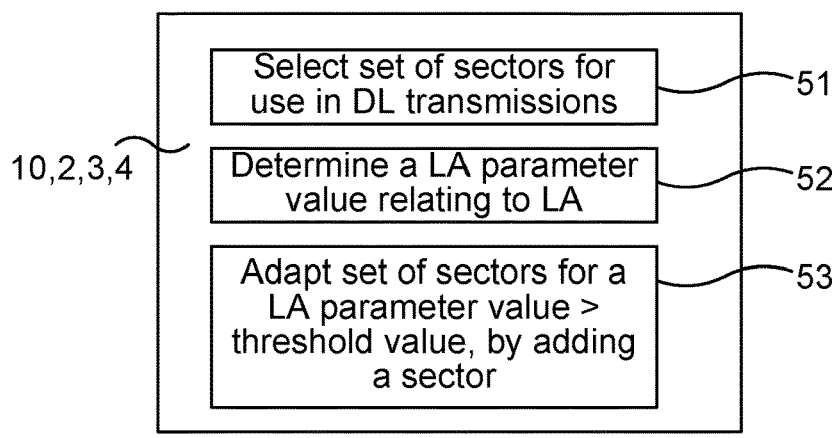
FIG. 7 illustrates a network node of a communication system comprising function modules/software modules for implementing methods of the present disclosure.

An example of an implementation using function modules/software modules is illustrated in FIG. 7, in particular illustrating as an example a network node 2, 3, 4, 10 of the communication system 1, comprising function modules for implementing methods of the present disclosure (also compare FIG. 4 and related description). The communication system 1, e.g. the network node 2, 3, 4, 10 thereof, comprises means, for example a first function module 51, for selecting, for the communication device, a set of sectors for use in downlink transmissions to the communication device 5. The communication system 1, e.g. the network node 2, 3, 4, 10 thereof, comprises means, for example a second function module 52 for determining 32, for the communication device 5, a link adaptation parameter value relating to the link adaptation. The communication system 1, e.g. the network node 2, 3, 4, to thereof, comprises means, for example a third function module 53 for adapting, for a link adaptation parameter value that is higher than a threshold value, the set of sectors by adding a sector.

The function modules 51, 52, 53 can, as mentioned earlier, be implemented using software instructions such as computer program executing in a processor and/or using hardware, such as application specific integrated circuits, field programmable gate arrays, discrete logical components etc.

It is noted that further function modules may be provided for performing any of the described functions and features. Such function modules may be distributed within the communication system 1, or be included in a single network node thereof.

Modifications of the disclosed embodiments and other embodiments will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for sector selection performed in a communication system providing wireless communication to a communication device, the communication system being configured for shared cell deployment, the shared cell comprising at least two sectors, the communication system being configured for link adaptation of a radio link between the communication device and the shared cell, the method comprising:
  selecting, for the communication device, a first set of sectors for use in downlink transmissions to the communication device; wherein the first set of sectors is selected based on path loss measurements per sector;
  after selecting the first set of sectors, transmitting data to the communication device using the first set of sectors;
  determining, for the communication device, a link adaptation parameter value relating to the link adaptation, wherein the link adaptation parameter value indicates if the selected first set of sectors is sufficient in view of data throughput or signal quality;
  determining whether the determined link adaptation parameter value satisfies a condition; wherein the condition comprises extending the selected first set of sectors whenever an outer loop compensation exceeds a pre-configurable threshold;
  as a result of determining that the link adaptation parameter value satisfies the condition, defining a second set of sectors by adding at least one additional sector to the first set of sector, wherein the second set of sectors includes each sector included in the first set of sectors plus the at least one additional sector which is not included in the first set of sectors such that the second set of sectors is larger than the first set of sectors by at least one sector; and
  after defining the second set of sectors transmitting data to the communication device using the second set of sectors.

2. The method of claim 1, wherein the link adaptation comprises a downlink link adaptation,
  the link adaptation parameter value comprises a Signal-to-Interference and Noise ratio (SINR) adjustment value,
  the threshold comprises a SINR adjustment threshold, and determining the link adaptation parameter value comprises:
    receiving, from the communication device, a feedback report relating to a downlink transmission, the feedback report comprising a positive or negative acknowledgment, and
    determining the link adaptation parameter value based on the received feedback report.

3. The method of claim 1, wherein the link adaptation comprises a downlink link adaptation and wherein the link adaptation parameter value comprises a block error rate and wherein determining the link adaptation parameter value comprises:
    determining a block error rate for the communication device based on feedback reports relating to downlink transmissions to the communication device.

4. The method of claim 3, wherein the determining of the block error rate is based on at least two feedback reports, the at least two feedback report relating to respective downlink transmission to the communication device.

5. The method of claim 3, wherein the feedback reports comprise one or both of: a positive acknowledgment and a negative acknowledgment.

6. The method of claim 1, comprising:
    as a result of adding an additional sector to the first set of sectors, starting a time counter;
    determining, based on the time counter, whether at least a threshold amount of time has elapsed since the additional sector was added to the first set of sectors;
    as a result of determining that at least the threshold amount of time has elapsed since the additional sector was added to the first set of sectors, defining a third set of sectors that is smaller than the second set of sectors by removing a sector from the second set of sectors; and
    using the third set of sectors to transmit data to the communication device.

7. The method as claimed of claim 1, wherein the selecting the first set of sectors comprises:
    receiving, from one or more of the sectors, uplink channel measurements relating to the communication device, and
    selecting the first set of sectors based on the uplink channel measurements.

8. The method of claim 7, wherein the selecting comprises determining, for each respective sector, path gain to the communication device based on the received uplink channel measurements and selecting N sectors having N highest path gains as the first set of sectors.

9. The method of claim 1, wherein the link adaptation parameter value comprises one or more of: block error rate, signal-to-interference and noise ratio, throughput degradation, and increased number of retransmissions.

10. The method of claim 1, wherein the additional sector has the highest path gain to the communication device among sectors not currently used by the communication device.

11. The method of claim 1, wherein the method is performed by a network node of the communication system.

12. A communication system for sector selection, the communication system providing wireless communication to a communication device, the communication system being configured for shared cell deployment, the communication system being configured for link adaptation of a radio link between the communication device and a shared cell comprising at least two sectors, the communication system comprising at least one processor and memory, the memory containing instructions executable by the processor, whereby the communication system is operative to:
    select, for the communication device, a first set of sectors for use in downlink transmissions to the communication device; wherein the first set of sectors is selected based on path loss measurements per sector;
    after selecting the first set of sectors transmitting data to the communication device using the first set of sectors;
    determine, for the communication device, a link adaptation parameter value relating to the link adaptation, wherein the link adaptation parameter value indicates if the selected first set of sectors is sufficient in view of data throughput or signal quality
    determine whether the determined link adaptation parameter value satisfies a condition; wherein the condition comprises extending the selected first set of sectors whenever an outer loop compensation exceeds a pre-configurable threshold;
    as a result of determining that the link adaptation parameter value satisfies the condition, define a second set of sectors by adding at least one additional sector to the first set of sector, wherein the second set of sectors includes each sector included in the first set of sectors plus the at least one additional sector which is not included in the first set of sectors such that the second set of sectors is larger than the first set of sectors by at least one sector; and
    after defining the second set of sectors transmitting data to the communication device using the second set of sectors.

13. The communication system of claim 12, wherein
the link adaptation comprises a downlink link adaptation,
the link adaptation parameter value comprises a Signal-to-Interference and Noise ratio (SINR) adjustment value,
the threshold comprises a SINR adjustment threshold, and
determining the link adaptation parameter value comprises:
    receiving, from the communication device, a feedback report relating to a downlink transmission, the feedback report comprising a positive or negative acknowledgment, and
    determining the link adaptation parameter value based on the received feedback report.

14. The communication system of claim 12, wherein the link adaptation comprises a downlink link adaptation and wherein the link adaptation parameter value comprises a block error rate and wherein the communication system is configured to determine the link adaptation parameter value by:
    determining a block error rate for the communication device based on feedback reports relating to downlink transmissions to the communication device.

15. The communication system of claim 14, wherein the communication system is configured to determine the block error rate based on at least two feedback reports, the at least two feedback report relating to respective downlink transmission to the communication device.

16. The communication system of claim 14, wherein the feedback reports comprise positive and/or negative acknowledgment messages.

17. The communication system of claim 12, wherein the communication system is configured to:
    start a time counter as a result of adding an additional sector to the first set of sectors;
    determine, based on the time counter, whether at least a threshold amount of time has elapsed since the additional sector was added to the first set of sectors;
    define a third set of sectors that is smaller than the second set of sectors by removing a sector from the second set of sectors as a result of determining that at least the threshold amount of time has elapsed since the additional sector was added to the first set of sectors; and use the third set of sectors to transmit data to the communication device.

18. The communication system of claim 12, wherein the communication system is configured to select the first set of sectors by:

receiving, from one or more of the sectors, uplink channel measurements relating to the communication device, and selecting the first set of sectors based on the uplink channel measurements.

19. The communication system of claim 18, wherein the communication system is configured to select by determining, for each respective sector, path gain to the communication device based on the received uplink channel measurements and selecting N sectors having N highest path gains as the first set of sectors.

20. The communication system of claim 12, wherein the link adaptation parameter value comprises block error rate, signal-to-interference and noise ratio, throughput degradation or increased number of retransmissions.

21. The communication system of claim 12, wherein the communication system is configured to adapt by adding a sector having the highest path gain to the communication device among sectors not currently used by the communication device.

22. The communication system of claim 12, wherein the at least one processor and memory are housed within a single network node.

23. A computer program product comprising a non-transitory computer readable medium storing a computer program for sector selection for a communication system providing wireless communication to a communication device, the communication system being configured for shared cell deployment, the communication system being configured for link adaptation of a radio link between the communication device and a sector of a shared cell, the computer program comprising computer program code, which, when run on the communication system causes the communication system to:

select, for the communication device, a first set of sectors for use in downlink transmissions to the communication device; wherein the first set of sectors is selected based on path loss measurements per sector;

after selecting the first set of sectors transmitting data to the communication device using the first set of sectors;

determine, for the communication device, a link adaptation parameter value relating to the link adaptation, wherein the link adaptation parameter value indicates if the selected first set of sectors is sufficient in view of data throughput or signal quality determine whether the determined link adaptation parameter value satisfies a condition; wherein the condition comprises extending the selected first set of sectors whenever an outer loop compensation exceeds a pre-configurable threshold;

as a result of determining that the link adaptation parameter value satisfies the condition, define a second set of sectors by adding at least one additional sector to the first set of sector, wherein the second set of sectors includes each sector included in the first set of sectors plus the at least one additional sector which is not included in the first set of sectors such that the second set of sectors is larger than the first set of sectors by at least one sector; and after defining the second set of sectors transmitting data to the communication device using the second set of sectors.

* * * * *